United States Patent [19]

Chiklis

[11] Patent Number: 4,647,157
[45] Date of Patent: Mar. 3, 1987

[54] FLUOROELASTOMERIC SEALANTS FOR LIQUID CRYSTAL CELLS

[75] Inventor: Charles K. Chiklis, Lexington, Mass.

[73] Assignee: Polaroid Corporation, Cambridge, Mass.

[21] Appl. No.: 678,113

[22] Filed: Dec. 4, 1984

[51] Int. Cl.$^4$ ............................................. G02F 1/133
[52] U.S. Cl. ..................................... 350/343; 350/336
[58] Field of Search .................. 350/336, 347 E, 338, 350/397, 398, 343; 368/204

[56] References Cited

U.S. PATENT DOCUMENTS

| | | | |
|---|---|---|---|
| 2,968,649 | 1/1961 | Pailthorp et al. | 260/80.5 |
| 3,700,306 | 10/1972 | Cartmell et al. | 350/150 |
| 3,785,721 | 1/1974 | Harsch | 350/347 E |
| 3,835,463 | 9/1974 | Tsukamoto | 350/333 X |
| 3,871,746 | 3/1975 | Muto et al. | 350/160 LC |
| 3,914,017 | 10/1975 | Bedell et al. | 350/398 |
| 3,994,568 | 11/1976 | King et al. | 350/160 LC |
| 4,012,119 | 3/1977 | Adams et al. | 350/338 |
| 4,217,035 | 8/1980 | Doriguzzi et al. | 350/338 |
| 4,292,370 | 9/1981 | Pekko | 350/337 X |
| 4,466,742 | 8/1984 | Lemelson | 368/204 |
| 4,482,213 | 11/1984 | Piliavin et al. | 350/343 X |
| 4,494,825 | 1/1985 | Sasaki et al. | 350/343 |
| 4,575,190 | 3/1986 | Wood et al. | 350/343 X |

FOREIGN PATENT DOCUMENTS

| | | | |
|---|---|---|---|
| 0181527 | 11/1982 | Japan | 350/343 |
| 0644457 | 7/1984 | Japan | 350/336 |

OTHER PUBLICATIONS

Fluorel FT, trade bulletin Y-ITD 2481-1 of Commercial Chemicals Division/3M, St. Paul, MN, Dec. 1982.

*Primary Examiner*—John K. Corbin
*Assistant Examiner*—David Lewis
*Attorney, Agent, or Firm*—Louis G. Xiarhos

[57] ABSTRACT

A liquid crystal cell comprising a pair of opposed plates spaced apart a predetermined distance and containing a liquid crystal material confined therebetween by a fluoroelastomeric terpolymer sealant comprising repeating units of vinylidene fluoride, hexafluoropropylene and tetrafluoroethylene.

18 Claims, 4 Drawing Figures

FLUOROELASTOMERIC SEALANTS FOR LIQUID CRYSTAL CELLS

BACKGROUND OF THE INVENTION

This invention relates to a liquid crystal cell. More particularly, it relates to a liquid crystal cell wherein the liquid crystal material thereof is confined between opposed plates of the cell by a terpolymeric fluoroelastomer sealant.

Liquid crystal cells used for the production of display devices are well known and have been described in various patents and publications. In general, these cells comprise a pair of opposed plates spaced apart at a predetermined distance and contain a liquid crystal material confined therebetween. The liquid crystal material is confined between the plates by a gasket or sealant material which can be comprised of inorganic or organic material. Liquid crystal cells and examples of materials used as sealants or gaskets in the production thereof are described, for example, in U.S. Pat. No. 3,700,306 (issued Oct. 24, 1972 to J. V. Cartmell et al.); in U.S. Pat. No. 3,871,746 (issued Mar. 18, 1975 to R. Muto et al.; and in U.S. Pat. No. 3,994,568 (issued Nov. 30, 1976 to H. A. King et al.).

The manufacture and operational efficiency of a liquid crystal cell, or a display device prepared therefrom, can be influenced by the nature of the sealant or gasket material employed in the manufacture of the cell. Inorganic materials such as glass and frit material have, for example, been employed as sealant materials for liquid crystal cells. These materials are not readily processable and generally require high temperatures for application of the sealant material and provision of a suitable bond. These temperatures are particularly disadvantageous where the plates are desirably formed from a plastic material such as polyester or the like. The more readily processable organic polymer sealant materials can also present difficulties in the fabrication of a liquid crystal cell. For example, the integrity of the polymeric seal will oftentimes be sacrificed over a period of time by chemical attack or degradation of the sealant material by the liquid crystal material. This in turn can lead to swelling and softening of the sealant material and, in the case of gross failure, can lead to the formation and appearance of bubbles in the liquid crystal cell. The polymeric sealant can also be a source of liquid crystal contamination as a consequence of diffusion of contaminants from the polymeric sealant material into the liquid crystal material confined between the opposing plates of the cell. This can lead to inefficiency in the electrical operation of the cell and premature failure of the cell.

SUMMARY OF THE INVENTION

It has been found that an effective seal for the containment of a liquid crystal material between spaced and opposed plates can be provided by using as the sealant material, a fluoroelastomer terpolymer of vinylidene fluoride, hexafluoropropylene and tetrafluoroethylene. The fluoroelastomer can be applied to one or both of the opposing plates and can be heat activated for provision of a seal which is non-contaminating and which resists attack by the liquid crystal material, so as to permit the manufacture of a liquid crystal cell which exhibits desirable electrical performance over a prolonged period of time.

DETAILED DESCRIPTION OF THE INVENTION

Figure 1:
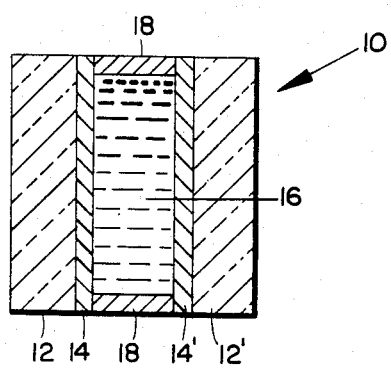
FIG. 1 is a view in cross-section of a liquid crystal cell filled with liquid crystal material and including a sealant of fluoroelastomeric terpolymer of the invention.

A liquid crystal cell of the invention having a fluoroelastomeric terpolymer sealant is illustrated in FIG. 1 which, while not to scale, shows in cross section, a liquid crystal cell generally referred to therein by the reference character 10. The liquid crystal cell 10 includes a pair of opposed plates 12 and 12' spaced from one another in a substantially parallel relationship. Plates 12 and 12' provide primary support for the liquid crystal cell and can be composed of glass, plastic or like transparent or translucent material. Shown on each of plates 12 and 12' are transparent conductive layers 14 and 14'. The transparent conductive layers 14 and 14' may be of any conventional metal or metal oxide material, including silver, gold or the known tin-oxide or indium-oxide electroconductive coatings. In cell 10, liquid crystal material 16 is shown between the plates and is confined therebetween by seal 18 which comprises a fluoroelastomeric terpolymer.

The fluoroelastomeric terpolymer used in the devices of the present invention is a terpolymer of vinylidene fluoride, hexafluoropropylene and tetrafluoroethylene and, thus, is comprised of repeating units of the formulas (I), (II) and (III), respectively:

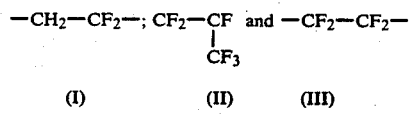

(I)        (II)        (III)

In general, the terpolymers used herein will contain from 3% to 35% by weight of the tetrafluoroethylene units; and from 97% to 65% by weight of vinylidene fluoride and hexafluoropropylene units, the weight ratio of vinylidene fluoride to hexafluoropropylene units being in the range of from 2.33:1 to 0.67:1. The weight ratio corresponds to a range of 70% to 40% by weight of vinylidene fluoride units and 30% to 60% by weight of hexafluoropropylene units. Within this weight ratio, the terpolymers are elastomeric.

Preferred ranges of repeating units in the terpolymers hereof comprise from 15% to 25% by weight tetrafluoroethylene units; and from 85% to 75% by weight of vinylidene fluoride and hexafluoropropylene units; the ratio of vinylidene fluoride and hexafluoropropylene units being in the range of 2.33:1 to 0.67:1 by weight.

Fluoroelastomeric terpolymers particularly useful herein contain the following units: from about 15% to about 25% tetrafluoroethylene units; about 40% to 55% vinylidene fluoride units; and about 30% to 35% hexafluoropropylene units. Fluoroelastomeric terpolymers suitable herein are commercially available. For example, good results are obtained using a fluoroelastomeric terpolymer available from the Minnesota Mining and Manufacturing Company under the trade designation Fluorel FT-2481 and having a fluorine level of about 67% by weight.

The terpolymers can be prepared by the copolymerization in known manner of a mixture of the corresponding monomers. An aqueous redox polymerization system can be used and polymerization can be initiated by resort to a conventional ammonium persulfate/sodium bisulfite system. Polymerization will normally be accomplished under pressure at moderately elevated temperatures. Suitable methods for the production of terpolymers useful herein are known and are described in greater detail in U.S. Pat. No. 2,968,649 (issued Jan. 17, 1961 to J. R. Pailthorp et al.).

The fluorolastomeric terpolymer used to effect a seal between the elements of a liquid crystal cell and to confine the liquid crystal material therebetween has certain essential properties suited to this particular purpose. The terpolymer shows resistance to attack by the liquid crystal material. This property allows the cell to be used over a prolonged period without softening or other structural impairment of the seal, leaking of liquid crystal material from the cell, or undesirable permeation of air and moisture into the cell through the impaired seal.

The fluoroelastomeric sealant used herein is non-contaminating, i.e., deleterious substances are not diffused therefrom into the liquid crystal material so as to adversely affect the proper functioning of the liquid crystal material in the operation of the cell. The preparation of the fluoroelastomeric terpolymer and the nature of the repeating units thereof are such as to allow compatible functioning of both the sealant and liquid crystal components of the cell.

The fluoroelastomeric terpolymer is particularly useful in exhibiting desirable adhesive and cohesive properties. In the production of plate elements for the containment of liquid crystal material therebetween, it is known to employ on each element, as a layer next adjacent the liquid crystal material, a layer of material which serves to permit alignment of the liquid crystal molecules in contact therewith, according to the orientation, as by pre-rubbing, of the alignment layer. Among other materials, fluorinated polymers, such as are described in detail in U.S. Pat. No. 4,066,814, can be used in the production of effective alignment layers. An example of a suitable alignment layer is a layer including a mixture of chlorotrifluoroethylene/vinylidene fluoride copolymer; polymethyl methacrylate; and vinylidine fluoride/tetrafluoroethylene copolymer. It has been found that the fluoroelastomeric terpolymer sealant adheres to a fluoropolymer-containing alignment layer. This makes possible the formation by heat sealing of an effective bond between the sealant material and a fluoropolymer-containing alignment layer.

The fluoroelastomeric terpolymer, in addition, exhibits good cohesiveness. Thus, a layer, usually a peripheral application, of sealant can be provided on each of the opposed plates, and upon contact of the opposing surfaces of sealant and application of heat, an effective seal can be provided between the opposed plates.

The fluoroelastomeric terpolymer, while exhibiting desirable resistance to liquid crystal material, can be sufficiently dissolved in appropriate solvent materials so to permit application to the surface or surfaces to be sealed. This can be accomplished, for example, by dissolving the terpolymer in methyl propyl ketone, cyclohexanone or a mixture thereof. The resulting solution can then be applied by coating, spraying, dipping or the like, such as by screen printing or gravure printing. The coating solution can be applied, for example, at a thickness of about 0.0005 to 0.001 inch (0.013 to 0.025 mm.) to the surface of one of the elements to be joined, and upon application of heat (e.g., 150°–175° C.) can be activated to an effective seal.

The fluoroelastomeric terpolymer can be applied in various ways to the elements to be joined. For example, a peripheral layer of sealant material can be applied to opposite edge portions (on the same face) of one rectangular plate to be joined. A second rectangular plate, similarly provided with sealant material on opposite edges, can be interfaced orthogonally with the first plate, so that a seal is provided around four edges of the joined cell. Alternatively, of one or both plates can be printed with adhesive material, in the form of a peripheral border or window, surrounding the liquid crystal material. Other suitable applications of sealant material can be employed.

Figure 2:
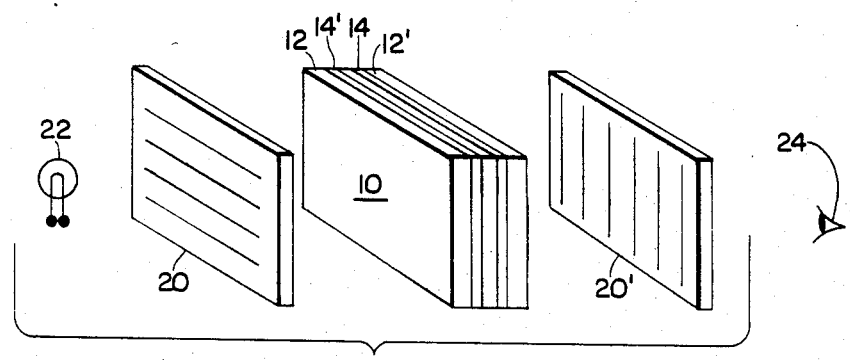
FIG. 2 is a perspective view, partly schematic, of a liquid crystal display device embodying a liquid crystal cell as shown in FIG. 1 and adapted to permit the selective transmission of light.

In FIG. 2 is shown a liquid crystal display device formed from the liquid crystal cell of FIG. 1 by the external placement of polarizers on each side of the cell. The device of FIG. 2 comprises liquid crystal cell 10, as shown in FIG. 1, sandwiched between crossed polarizers 20 and 20'. As shown, the polarization axes of polarizers 20 and 20' are orthogonal with respect to one another. Light from light source 22 passes through polarizer 20 and is thereby plane polarized. When no voltage is applied across conductive layers 14 and 14' liquid crystal cell 10 rotates the plane of polarization of the light passing therethrough by 90° which can then be passed through polarizer 20' and received by the eye 24. Upon application of a voltage to conductive layers 14 and 14' (by means not shown), the capacity of the liquid crystal material in cell 10 to rotate the plane of polarized light is lost, such that the plane polarized light passing through cell 10 is not passed by polarizer 20' (owing to the polarization axis thereof being orthogonal to the plane of polarized light impinged thereon). As a consequence, no transmission is observed by the eye 24.

While in FIG. 2, the polarizers 20 and 20' are shown in a crossed relation to one another, the polarizers can be placed in parallel relation. In this event, there is no transmission of light when no field is applied to cell 10; and transmission is observed when a voltage is applied to cell 10.

Figure 3:
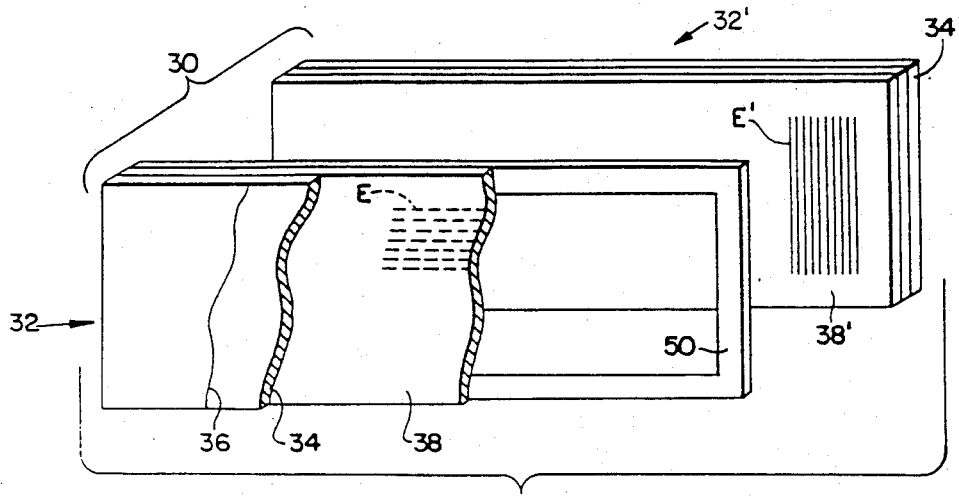
FIG. 3 is an exploded isometric view of a liquid crystal display device of a preferred structure and including a sealant of fluoroelastomeric terpolymer of the invention.

In FIG. 3 is shown an exploded isometric view of a preferred liquid crystal display device wherein polarizers are incorporated into the device as internal elements, in contrast to the external placement of polarizers as shown in FIG. 2. In the display device of FIG. 3, generally referred to by the reference character 30, are shown front and rear laminate assemblies 32 and 32' which, when assembled together with a liquid crystal material confined therebetween, form the completed liquid crystal display. The front and rear assemblies 32 and 32' may be constructed in identical fashion or one or both may be modified depending upon the type of display desired to include a reflector or transreflector layer, as described more fully below.

The laminate assemblies 32 and 32' each include transparent substrates 34 and 34' which provide primary mechanical support for the completed liquid crystal display. The substrates 34 and 34' are preferably fabricated from a transparent or translucent polyester such as polyethylene terephthalate. Substrate materials 34 and 34' will desirably be flexible sheet materials so as to facilitate handling and manufacture of the liquid crystal display devices hereof according to an automated production method. Polymeric film materials suited to use herein include cellulose esters such as nitrocellulose, cellulose acetate or cellulose acetate butyrate, polyesters, polycarbonates, vinyl polymers such as acrylics, or other polymers that can be provided in a sheet-like light transmissive form.

The polyesters are especially useful from the standpoints of low cost and ready availability and ease of handling in manufacture. Typically such polyester materials will be biaxially oriented and will exhibit birefringence. The birefringent character of such support material is not a detriment to the operation of the devices hereof inasmuch as the biaxially oriented and birefringent support materials will be positioned in such devices outwardly of the light-polarizing and other electro-optical elements of the device. A preferred polyester is polyethylene terephthalate available under the Mylar and Estar tradenames, although other polyethylene terephthalate materials can be employed.

The thickness of the substrates 34 and 34' should be sufficient to impart the desired structural strength to the final liquid crystal display 30. In accordance with one preferred embodiment, the substrates 34 and 34' are 7 mils. thick (about 0.178 mm.).

If desired, the support substrates 34 and 34' may be provided with exterior overcoats or layers 36 and 36' that function as antireflection coatings or antiabrasion coatings. A preferred material for use as an exterior protective coating for polyethylene terephthalate is a low index of refraction fluorinated polymer, preferably coated at a quarter wave optical thickness for visible light. Fluorinated polymers and methods for their application to polyester substrate materials are described in detail in U.S. Pat. No. 4,066,814 to Chiklis and can be suitably employed herein.

Polarizing layers 38 and 38' are laminated to the support substrates 34 and 34', respectively, by means of an intermediate transparent adhesive, generally indicated at 40 and 40', repsectively. Polarizing layers 38 and 38', which may be of the same or different polarizing material, are comprised of linear dichroic light-polarizing material. It will be preferred that each of polarizing layers 38 and 38' comprise a single layer of light-polarizing material so as to minimize the thickness of the liquid crystal display device. In general, the polarizing layer will have a thickness in the range of about 0.1 to 3 mils (about 0.0025 to 0.076 mm.).

A preferred material to serve as polarizing layer 38 and 38' is a unitary layer of stretched (oriented) polyvinyl alcohol of about one-mil thickness (0.025 mm.) stained according to known methods with a dichroic dye such as iodine. Such a polarizing material will also be preferably borated for improved stability. Suitable polarizing layers of this type can be prepared utilizing methods set forth in U.S. Pat. No. Re. 23,297 and in U.S. Pat. No. 4,166,871. An especially preferred polarizing material is a stretched polyvinyl alcohol sheet containing polyvinylene light-polarizing species such as may be provided by hydrochloric acid vapor processing in known manner. Preferably, such polarizing material will be borated for improved stability. Suitable methods for the production of such polarizing materials are described in U.S. Pat. No. 2,445,555. The polarizing layers hereof can be readily bonded to transparent substrate materials 34 and 34' which provide primary mechanical support for the completed liquid crystal displays. The axis of polarization of the polarizing layer 38 and 38' can be aligned orthogonally relative to each other or in parallel relation, for example, orthogonally at an angle of 45° and 135°, respectively, from the vertical in FIG. 3.

The transparent adhesive used to affix the polarizing layers 38 and 38' to the respective substrates 34 and 34' should be selected for environmental stability and for adherencey to both the substrate material and the polarizing layers 38 and 38'. For this latter purpose, the adhesive should be hydrophilic if the polarizing material is essentially of a polyvinyl or other hydrophilic alcohol constituency. Suitable adhesives include polyvinyl alcohol and urethane-based adhesive materials. The thickness of the transparent adhesive layers 40 and 40' is selected to be sufficiently thick to achieve the intended purpose without adversely affecting the optical transmission properties of the completed liquid crystal display. In general, an adhesive layer, having a thickness of up to about 1.0 mil. (about 0.025 mm.) is satisfactory.

Transparent conductive layers 42 and 42' are applied over the polarizing layers 38 and 38'. The transparent conductive layers 42 and 42' may be of any conventional metal or metal oxide material including silver, gold, indium oxide, indium-tin oxide, or the like, applied by any conventional method including vapor deposition, magnetron sputtering, or by bombardment from a plasma generator or the like. In addition, the transparent conductive layers 42 and 42' may be subjected to a photoresist etching process to form multi-segment numeric or alphanumeric display patterns or, as shown in FIG. 3, closely spaced parallel electrode lines E and E' which are crossed relative to one another. An addressable picture element (pixel) is defined at the intersection of each of the electrode lines E and E'.

If desired, transparent conductive layers 42 and 42' can comprise multiple layers. Thus, conductive electrodes having improved transmission properties can be provided from a suitable conductive metal, such as silver, sandwiched between layers of a high index of refraction dielectric material such as indium oxide, titanium dioxide or the like. A preferred conductive electrode material 42 and/or 42' comprises a titania/silver/titania arrangement of layers which can be suitably deposited by vacuum deposition technique over polarizing layers 38 and 38' carried on support material 34 and 34'. Preferably, the silver layer will contain a minor amount of gold, platinum or like metal to provide environmental stability. A web of polyester containing a polarizing layer can be passed in a series of passes over vapors of titania, silver, and titania, respectively, so as to deposit the desired layers. A slotted mask can be used, if desired, to effect a selective deposition of the vapors in the form of spaced electrode lines which define pixels at the intersection thereof. Alternatively, a continuous coating of electrode material can be subjected to an etching process to selectively remove conductive material to achieve a predetermined electrode pattern.

Figure 4:
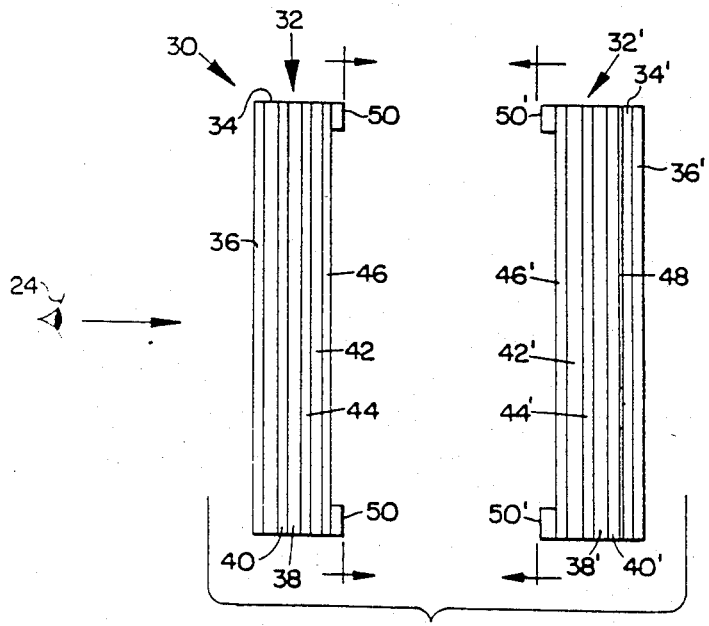
FIG. 4 is a side elevational view in cross section of the liquid crystal display of FIG. 3.

As shown in FIG. 4, protective layers 44 and 44' can be applied to the confronting surfaces of the polarizing layers 38 and 38', respectively, before the transparent conductive layers 42 and 42' are applied. These protective layers while not essential are preferred and serve important barrier functions in protecting the conductive electrodes from possible corrosive or degradative influences of the polarizing layers 38 and 38' and in preventing the contamination of the liquid crystal material by components of such polarizing layers. In addition, protective or barrier layers 44 and 44' serve to protect polarizing layers 38 and 38' against the effect of the optically active liquid crystal material which may be chemically incompatible therewith. The protective layers 44 and 44' can also assist in protecting the polarizing layers 38 and 38' where, for example, selected areas of the transparent conductive layers 42 and 42' are removed by chemical treatment in a photo-resist etching process. For example, where the polarizing material is essentially of a polyvinyl alcohol constituency, the protective layers 44 and 44' intermediate the polarizing layers and the transparent conductive layers 42 and 42', respectively, may be nitrocellulose or the like. Other materials can, however, be employed. Suitable examples include polyvinylidene chloride, polyvinyl acetal, and the fluorinated polymers such as are disclosed in the aforementioned U.S. Pat. No. 4,066,814. A preferred material is polyvinylidene chloride. A thickness of between 0.10 micron and 20 microns for the protective layers 44 and 44' is satisfactory.

Alignment layers 46 and 46' are applied over the transparent conductive layers 42 and 42' including the protective layers 44 and 44' where the conductive layers 42 and 42' have been removed. The alignment layer 46 and 46' function to orient the typically elongated liquid crystal molecules in contact therewith along a predetermined direction.

The alignment layers 46 and 46' may be of any conventional material and can be deposited by preferential coating, by vapor deposition, or other processes. The alignment materials can include $S_iO_2$ deposited by preferential vapor deposition or a polyamide or polyimide layer that is subsequently rubbed or buffed to establish an orientation in the desired direction. The alignment layers 46 and 46' may be of polyvinyl alcohol, for example, and approximately 500 angstroms in thickness. Other suitable materials include polyvinylidene chloride, polyvinyl acetal and the preferred fluorinated polymers as described hereinbefore.

As shown in FIG. 4, the laminate assembly 32', if designated as the rear assembly (opposite the front or viewing assembly), may be provided with a reflector or transreflector layer 48 so that the assembled liquid crystal display 30 can operate in either a reflecting or transmission mode. A suitable material for the reflective layer is aluminum applied by vapor deposition or a metallic foil laminated between substrate 44' and polarizing layer 38', either sufficient to achieve the desired reflective effect.

The two laminated assemblies 32 and 32' are sealed to one another by a seal comprised of layers 50 and 50' of fluoroelastomeric terpolymer hereof which, as shown in FIG. 3, has a rectangular form with length and width dimensions that define the area of the liquid crystal material. The seal can be preprinted onto one, or as shown in FIG. 4, onto both of the laminated assemblies 32 or 32' in a rectangular or other desired form and then brought into contact and adhered to the other of the laminated assemblies.

In general, the liquid crystal material confined between the opposing alignment layers 46 and 46' of the laminated assemblies 32 and 32' is approximately 5 to 50 microns in thickness with 8-12 microns being typical. The liquid crystal material can be of any conventional composition. Good results can be obtained, for example, using a liquid crystal material of the known twisted nematic type. The liquid crystal material may include adjuncts such as pleochroic dyes or the like. If desired, the liquid crystal display can be sealed and simultaneously filled in accordance with the process described in the copending U.S. patent application Ser. No. 564,751, of L. Polizzotto, filed Dec. 22, 1983.

Spacer means (not shown) are incorporated into the area of the cell occupied by the liquid crystal material to assist in maintaining the thickness of the liquid crystal material. Spacer rods or fibers can be admixed with the liquid crystal material for this purpose. If desired, spacer elements can be applied to one of the elements. For example, polymer spacer elements can be printed by gravure or screen printing of, for example, a hot-melt polyamide or UV-curable acrylate onto alignment layer 44. Alternatively, a dispersion of spacer fibers can be coated and dried to provide suitable spacing means. Suitable spacers and their applications are described in the aforementioned, U.S. patent application Ser. No. 564,751. Other spacer means are known in the art and can be employed in the liquid crystal cells and devices hereof.

The advantages of the present invention can be illustrated by the following example which is intended to be non-limiting.

EXAMPLE 1

A liquid crystal display device having a perimeter seal of fluoroelastomeric terpolymer was prepared in the following manner. A 25% by weight solution of Fluorel FT-2481 (a 44/32/19 by weight fluoroelastomeric terpolymer of vinylidene fluoride, hexafluoropropylene and tetrafluoroethylene) in methyl propyl ketone was employed for the application of sealant to each of the elements to be joined in the construction of the display. Adhesive stripes of the sealant solution were applied by extrusion at about 0.5 to 1.5 mil thickness (0.013 to 0.038 mm.) along the edges of a web of a first element comprising a polyethylene terephthalate support, polarizing layer, a line-pattern electrode layer and an alignment layer. Stripes of the sealant solution were similarly applied to the edges of a second web comprising a polyethylene terephthalate support, an aluminum reflector layer, a polarizing layer, a line-pattern electrode layer and an alignment layer. The extruded sealant stripes were dried at 66° C. Sections were cut from each of the first and second webs and were brought into engagement orthogonally so as to define a perimeter of sealant material. Liquid crystal material was applied at the nip of the interfacing web sections and squeegeed by roll to uniformly spread the liquid crystal material between the web sections. Simultaneously with the application of liquid crystal material, the elements were sealed by a heated laminator (about 20 to 40 seconds at a temperature of 149° to 163° C. (300°-325° F.). The resulting perimeter seal was not degraded by the liquid crystal material confined thereby and did not undergo softening on storage. Leakage and current characteristics of the cell were not degraded.

It is expressly intended that the foregoing description and accompanying drawings are illustrative of preferred embodiments only, not limiting, and that the true spirit and scope of the present invention will be determined by reference to the appended claims.

What is claimed is:

1. A liquid crystal cell comprising a pair of opposed plates spaced from one another in a substantially parallel relationship and having a layer of liquid crystal material confined therebetween by a fluoroelastomeric terpolymer sealant, said sealant being provided between said plates about the peripheral edges of said cell and surrounding said liquid crystal material confined therebetween, said fluoroelastomeric terpolymer comprising by weight, from 3% to 35% tetrafluoroethylene units and from 97% to 65% of vinylidene fluoride and hexafluoropropylene units, the weight ratio of vinylidene fluoride to hexafluoropropylene units being in the range of from 2.33:1 to 0.67:1.

2. The liquid crystal cell of claim 1 wherein the fluoroelastomeric terpolymer sealant contains, by weight, from 15% to 25% tetrafluoroethylene units; and from 85% to 75% of vinylidene fluoride and hexafluoropropylene units, the weight ratio of vinylidene fluoride and hexafluoropropylene units being in the range of 2.33:1 to 0.67:1.

3. The liquid crystal cell of claim 1 wherein the fluoroelastomeric terpolymer sealant comprises, by weight, from about 15% to about 25% tetrafluoroethylene units; from about 40% to about 55% vinylidene fluoride units; and from about 30% to about 35% hexafluoropropylene units.

4. The liquid crystal cell of claim 1 wherein there is carried on the surface of each of said plates confronting said layer of liquid crystal material, a transparent conductive layer.

5. The liquid crystal cell of claim 1 wherein said layer of liquid crystal material has a thickness of approximately 5 to 50 microns.

6. The liquid crystal cell of claim 1 wherein plates are spaced from one another in said substantially parallel relationship by spacer rods or fibers admixed with said layer of liquid crystal material.

7. The liquid crystal cell of claim 1 wherein said plates are spaced from one another in said substantially parallel relationship by spacer elements applied to the face of one said plates confronting said layer of liquid crystal material.

8. A liquid crystal display structure comprising:
first and second laminate assemblies spaced from one another in a substantially parallel relationship, said first and second laminate assemblies having a layer of liquid crystal material confined therebetween by a seal means provided between said assemblies about the peripheral edges thereof and surrounding said liquid crystal material confined therebetween; each of said laminate assemblies including, in order from said liquid crystal material layer, an alignment layer; a conductive electrode material; a polarizing layer; and a polymeric support for said layers;
said seal means comprising a fluoroelastomeric terpolymer comprising by weight, from 3% to 35% tetrafluoroethylene units, and from 97% to 65% of vinylidene fluoride and hexafluoropropylene units, the weight ratio of vinylidene fluoride to hexafluoropropylene units being in the range of from 2.33:1 to 0.67:1.

9. The liquid crystal display of claim 8 wherein the fluoroelastomeric terpolymer sealant contains, by weight, from 15% to 25% tetrafluoroethylene units; and from 85% to 75% of vinylidene fluoride and hexafluoropropylene units, the weight ratio of vinylidene fluoride and hexafluoropropylene units being in the range of 2.33:1 to 0.67:1.

10. The liquid crystal display of claim 8 wherein the fluoroelastomeric terpolymer sealant comprises, by weight, from about 15% to about 25% tetrafluoroethylene units; from about 40% to about 55% vinylidene fluoride units; and from about 30% to about 35% hexafluoropropylene units.

11. The liquid crystal display of claim 8, wherein each of said polarizing layers has a thickness in the range of about 0.0025 to about 0.076 mm.

12. The liquid crystal display of claim 8, further comprising a reflective coating intermediate said substrate and said liquid crystal material layer.

13. The liquid crystal display of claim 8, wherein said liquid crystal material layer is between 5 and 50 microns in thickness.

14. The liquid crystal display of claim 8, wherein said conductive electrode material of each of said laminate assemblies is defined by spaced parallel stripes, the stripes of each laminate assembly oriented orthogonal to the other.

15. The liquid crystal display of claim 14, wherein said conductive electrode stripes comprise a conductive metal, said conductive metal being sandwiched between a pair of layers of dielectric material.

16. The liquid crystal display of claim 15, wherein said conductive electrode stripes comprise a sandwich arrangement of silver between layers of titanium dioxide.

17. The liquid crystal display of claim 8, wherein the plane of polarization of said polarizing layers are oriented at angles of 45° and 135°, respectively, from the vertical.

18. The liquid crystal display of claim 8, wherein each of said polarizing layers is a linear dichroic polarizing layer comprising a stretched polyvinyl alcohol sheet containing polyvinylene light-polarizing species.

* * * * *